United States Patent
Caveney (10) Patent No.: US 6,722,790 B2
(45) Date of Patent: Apr. 20, 2004

(54) CONTOURED INTERNAL STUB CRIMP BACKBONE

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 100 days.

(21) Appl. No.: 10/037,561

(22) Filed: Jan. 4, 2002

(65) Prior Publication Data

US 2003/0128938 A1 Jul. 10, 2003

(51) Int. Cl.[7] .................................................. G02B 6/36
(52) U.S. Cl. ........................................................ 385/81
(58) Field of Search ............................. 385/81, 62, 60, 385/66, 70, 72, 76, 77, 78, 85, 139

(56) References Cited

U.S. PATENT DOCUMENTS

| 4,101,198 | A | 7/1978 | Heldt |
| 4,370,022 | A | 1/1983 | Johnson |
| 4,810,053 | A | 3/1989 | Woith |
| 4,812,006 | A | 3/1989 | Osborn et al. |
| 5,048,921 | A | 9/1991 | Jones et al. |
| 5,159,655 | A | 10/1992 | Ziebol et al. |
| 5,396,572 | A | 3/1995 | Bradley et al. |
| 5,475,782 | A | 12/1995 | Ziebol |
| 5,530,785 | A | 6/1996 | Sakamoto et al. |
| 6,018,606 | A | 1/2000 | Sogabe et al. |
| 6,035,090 | A | 3/2000 | Kawaguchi et al. |
| 6,173,097 | B1 | 1/2001 | Throckmorton et al. |
| 6,179,482 | B1 | 1/2001 | Takizawa et al. |
| 6,196,731 | B1 | 3/2001 | Carlisle et al. |
| 6,234,685 | B1 | 5/2001 | Carlisle et al. |
| 6,259,856 | B1 | 7/2001 | Shahid |
| 6,282,348 | B1 | 8/2001 | Carlisle et al. |

FOREIGN PATENT DOCUMENTS

EP 1052532 A2 11/2000

*Primary Examiner*—Javaid H. Nasri
(74) *Attorney, Agent, or Firm*—Robert A. McCann; Jay A. Saltzman; Christopher S. Clancy (57) ABSTRACT

A fiber optic connector for terminating an optical fiber is disclosed. The connector comprises a housing having opposed first and second ends, and the housing receives the optical fiber at its first end. An elongated member is retainable in the housing, and the elongated member includes a crimpable portion. An insert is disposable within the crimpable portion. The crimpable portion of the elongated member is disposed within the housing, and the crimpable portion includes opposed first and second ends and a point between the first and second ends. The crimpable portion is tapered from the point toward one of the first and second ends.

29 Claims, 6 Drawing Sheets

CONTOURED INTERNAL STUB CRIMP BACKBONE

BACKGROUND OF THE INVENTION

The present invention is directed to a fiber optic connector for terminating an optical fiber and, more particularly, to a crimpable fiber optic connector for terminating an optical fiber. The connector includes a crimpable portion having a contoured crimp area.

Figure 6:
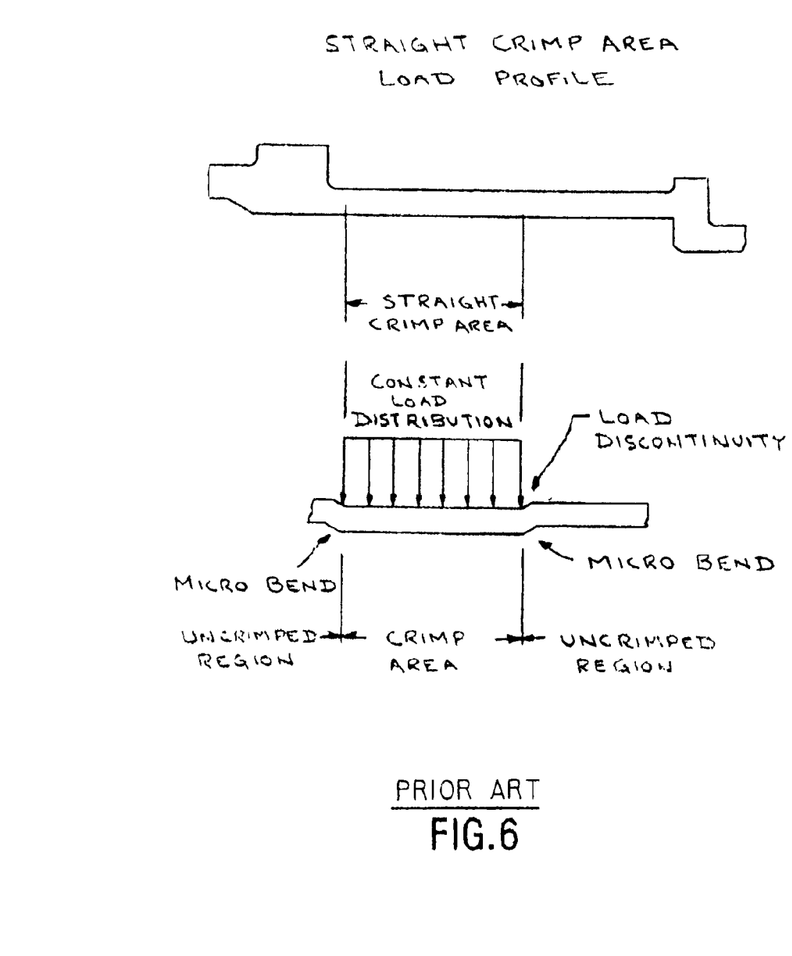
FIG. 6 shows a load distribution profile for a straight crimp area in accordance with the prior art.

Typically, fiber optic connectors include a crimpable portion having a straight profile crimp area that produces a constant load under the crimp area, as shown in FIG. 6. However, a straight profile crimp area may have an abrupt discontinuity at the ends of the crimp boundary, where the uncrimped regions meets the crimped region. This discontinuity may create a sharp micro-bend that may increase the stub connector's attenuation.

It would be desirable to provide a contoured crimp area configured so that when the crimp die force is applied to the crimp area, there will be minimal compression force at the ends of the crimp boundary and maximum compression force near the midpoint of the crimp area.

It would also be desirable to provide a crimp area having a smooth load transition at the ends of the crimp boundary.

It would further be desirable to apply a substantially triangular load distribution to the fiber optic cable (field fiber) that reduces fiber micro-bending within the top and bottom inserts in the crimp area during the crimping process, and thus, results in less fiber attenuation.

SUMMARY OF THE INVENTION

The invention includes a fiber optic connector for terminating an optical fiber. In one form, the connector comprises a housing having opposed first and second ends, and the housing receives the optical fiber at its first end. An elongated member is retainable in the housing, and the elongated member includes a crimpable portion. An insert is disposable within the crimpable portion. The crimpable portion of the elongated member is disposed within the housing, and the crimpable portion includes opposed first and second ends and a point between the first and second ends. The crimpable portion is tapered from the point toward one of the first and second ends. Moreover, the crimpable portion may be tapered from the point toward the other of the first and second ends.

Preferably, the connector includes two inserts disposable within the crimpable portion of the elongated member.

Preferably, the stub fiber contacts the glass fiber core in the two inserts. Alternatively, the stub fiber may contact the glass fiber core in the ferrule.

Preferably, the crimpable portion is configured so that when a crimp die force is applied to the crimpable portion, the force is greater at the point between the first and second ends than at the first and second ends.

The invention also includes a crimpable fiber optic connector for terminating an optical fiber, wherein the connector is crimpable by a crimp tool having opposed crimp dies thereon. At least one of the crimp dies has opposed first and second ends and a point between the first and second ends. The crimp die is tapered from the point toward one of the first and second ends. Preferably, the other crimp die has opposed first and second ends and a point between the first and second ends. The other crimp die is tapered from the point toward one of the first and second ends.

The invention also includes a method for assembling a fiber optic connector. Preferably, the crimpable portion of the elongated member and the buffer crimp portion are crimped simultaneously.

The invention further includes a method for terminating a multiple layered field optical fiber having a glass fiber core with an optical fiber connector.

DETAILED DESCRIPTION OF PREFERRED EMBODIMENTS

The illustrated embodiment of the invention is directed to an SC-style fiber optic connector for facilitating the connection of an optical fiber found in the field (field fiber) to an optical fiber predisposed in the connector (stub fiber), such that a fiber optic signal (light) may be passed from the field fiber to the stub fiber with minimal signal degradation occurring at the interface between the fibers.

The disclosure of application Ser. No. 10/014915, filed on Oct. 23, 2001, and commonly owned by the assignee of the present invention, is hereby incorporated by reference.

Figure 1:
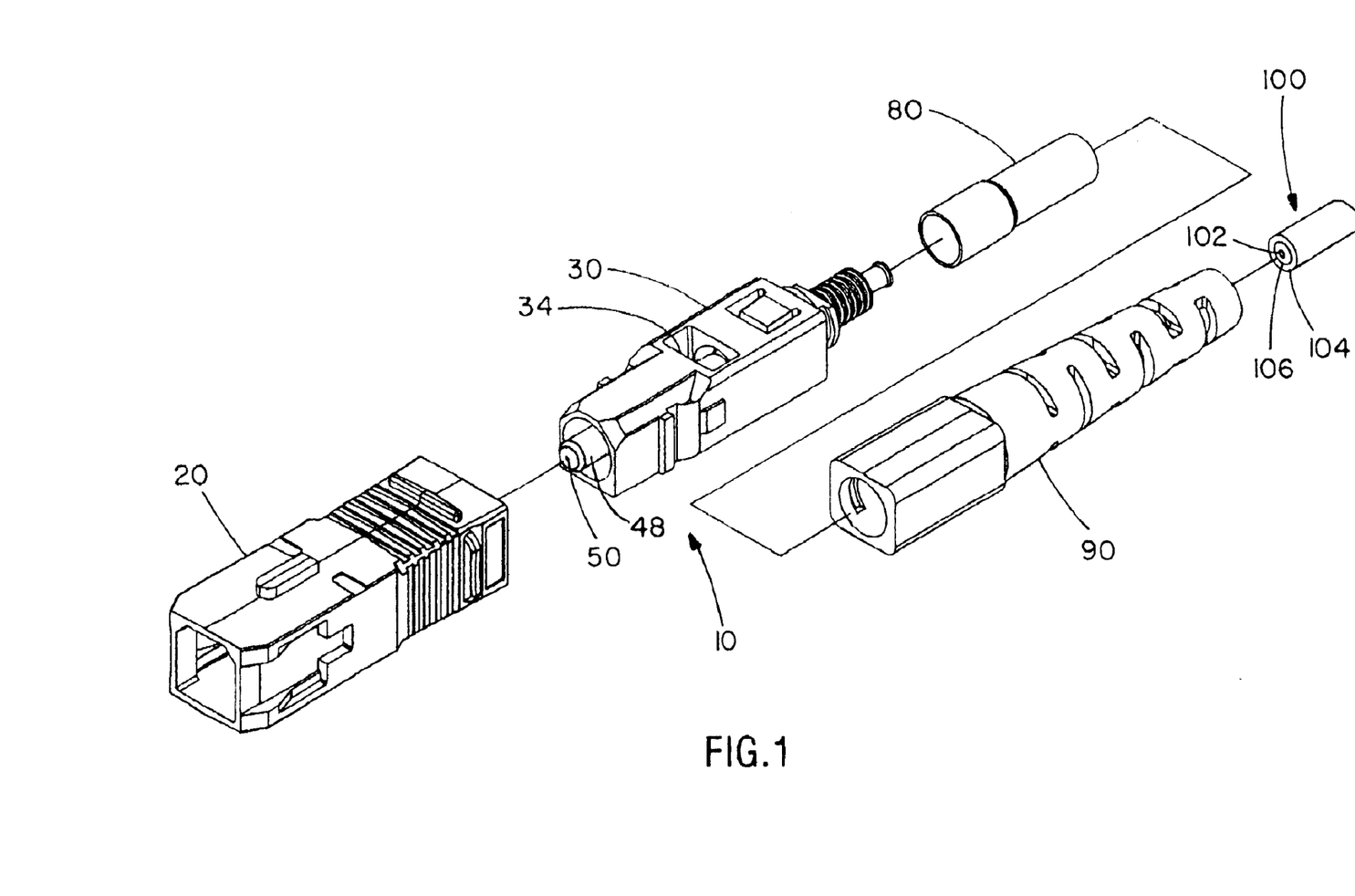
FIG. 1 shows an exploded view of a completely assembled connector in accordance with a preferred embodiment of the invention.

FIG. 1 shows an exploded view of a completely assembled SC-style fiber optic connector 10. As can be seen therein, in a preferred embodiment, the connector 10 includes an outer housing 20, an inner housing assembly 30, a crimp sleeve 80, and a boot 90. The connector is applied to a fiber optic cable 100, such as the one shown in cross section in FIG. 1. As also seen in FIG. 2, the inner housing assembly 30 includes a plastic inner housing 32 encircling an elongated, metallic, and sectionally tubular backbone 36, a helical spring 46, a cylindrical, polished ceramic ferrule 48, and top 54 and bottom 56 inserts.

Figure 2:
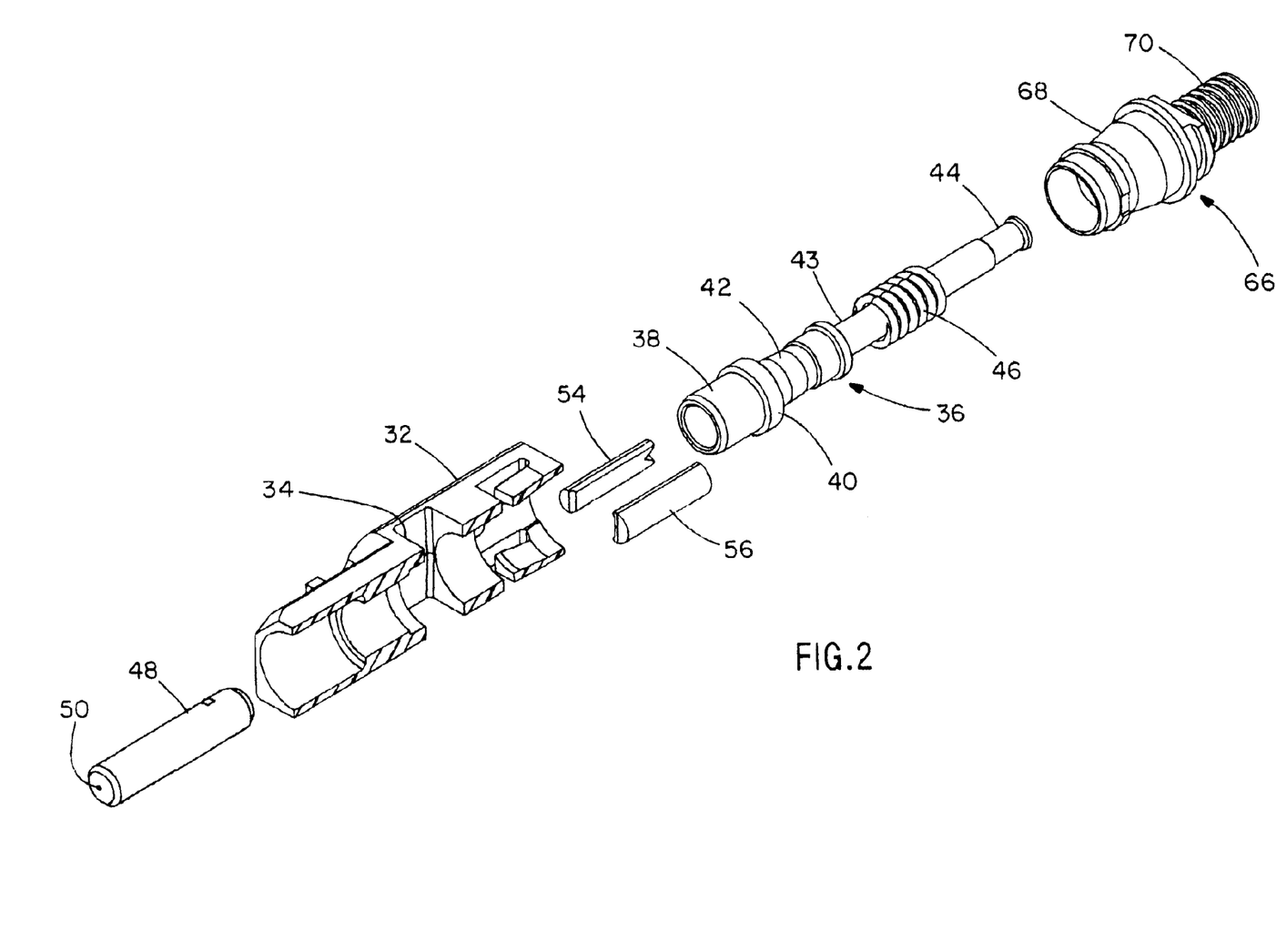
FIG. 2 shows an exploded view of an assembled inner housing assembly of the connector of FIG. 1.

In particular, as probably best seen in exploded FIG. 2, the backbone 36 has the helical spring 46 preferably disposed about a body portion 43 thereof, top and bottom inserts 54 and 56 respectively, are cooperatively inserted through the ferrule holding end 38 of the backbone 36 and into the glass fiber crimp section 42 thereof. The ceramic ferrule 48 is then inserted at least partly into the ferrule holding end 38 where it is maintained by interference fit friction, thereby securing the inserts 54 and 56 within the glass fiber crimp section 42. Alternatively, the ferrule 48 could be held in the ferrule holding end 38 by an adhesive. The assemblage of backbone, inserts, ferrule, and spring is then inserted into the inner housing 32, after which the front portion 68 of a corrugated endcap 66 is inserted into the rear of the inner housing 32 against the bias of the spring 46 until it snaps into place, thereby keeping the backbone 36 pressed as far forward as the projecting ring 40 thereof will permit it to travel until it comes flush with an interior portion of the inner housing 32. The endcap 66 fits over primarily the body portion 43 of the backbone 36 so that the buffer crimp portion 44 extends through the rear portion 70 of the endcap 66. Although the illustrated embodiment shows the backbone 36 and the component sections thereof being circular/cylindrical, they, and any later-described cooperating structure alternatively could be square/prismatic or otherwise shaped.

Top insert 54 and bottom insert 56, as seen in perspective in FIG. 2 and in cross-section in FIGS. 3, 4, 8 and 9, include tapered lead-ins 58 at the rear ends thereof to facilitate the field fiber 100 being inserted therebetween from the rear. As shown in FIG. 5, one or both of the inserts include groove portions 60 along the respective engagement surfaces thereof, 62 and 64, to permit the glass fiber 102 to pass therebetween along the longitudinal length of the inserts and to align with the rear entry to the aperture 50 of the ceramic ferrule 48. The ceramic ferrule 48 may also preferably include a tapered lead-in portion 52 at the rear end thereof to facilitate entry of the glass fiber 102. Such a lead-in 52 may take the form of a generally conical cut-away portion of the ferrule.

In the field, prior to insertion into the connector, the field fiber 100 is prepared by appropriately stripping the insulative layer(s) and any stiffening layer(s) off the end of the field fiber. As can be seen in FIG. 1, the layers may typically include, for example, a jacket 104, such as insulative rubber or plastic, and a buffer 106 made of insulative rubber or plastic. An intermediate strengthening layer (not shown), such as Kevlar®, may preferably circumferentially reside between the buffer 106 and jacket 104. A portion of the jacket 104 and a portion of the buffer 106 are stripped off. The now exposed glass fiber 102 is precision cleaved to an appropriate length.

Once the inner housing assembly 30 is fully assembled, it is placed onto a lower glass fiber crimping die 120 of a crimping tool (not shown). At this point, the crimping tool may be closed with very light pressure to simply hold the assembly 30 in place on the die 120. When the tool closes, the upper glass fiber crimping die 122 penetrates a crimp window 34 in the upper portion of the inner housing 32 to secure the assembly in place on the die.

After the inner housing assembly 30 is fully assembled and properly disposed on the crimping tool, the cleaved end of the field fiber 100 is then inserted through the buffer crimp portion 44 of the backbone 36. The cleaved end travels through the backbone 36, between the top and bottom inserts 54 and 56, respectively, therein, before entering the rear of the ferrule 48 and coming into aligned contact with the suitably precision cleaned and/or polished stub fiber 110 within the narrow axial aperture 50 of the ferrule 48.

Figure 3:
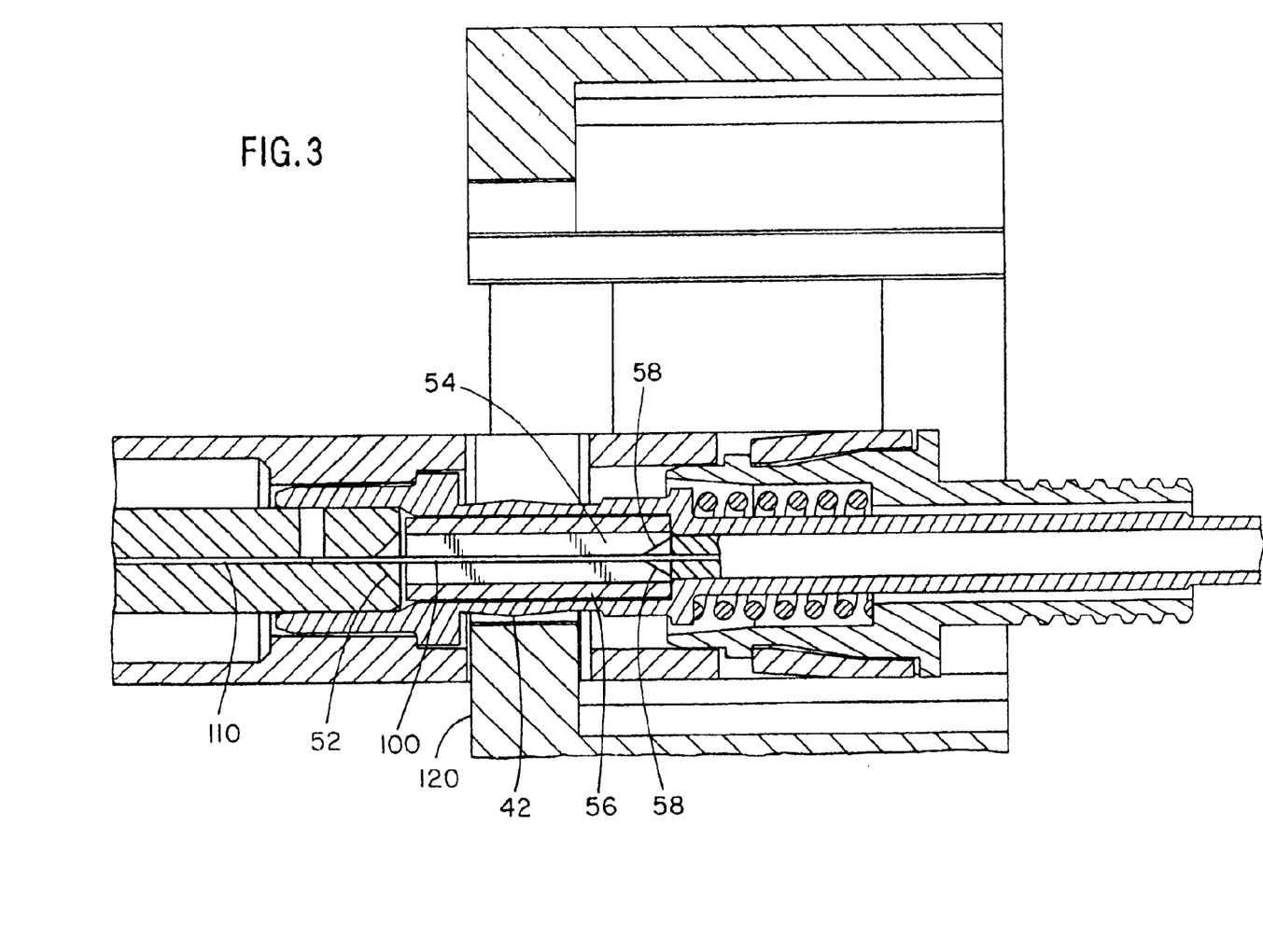
FIG. 3 shows a cross-sectional view of the connector of FIG. 1 in a crimping die prior to compression of the die.
Figure 4:
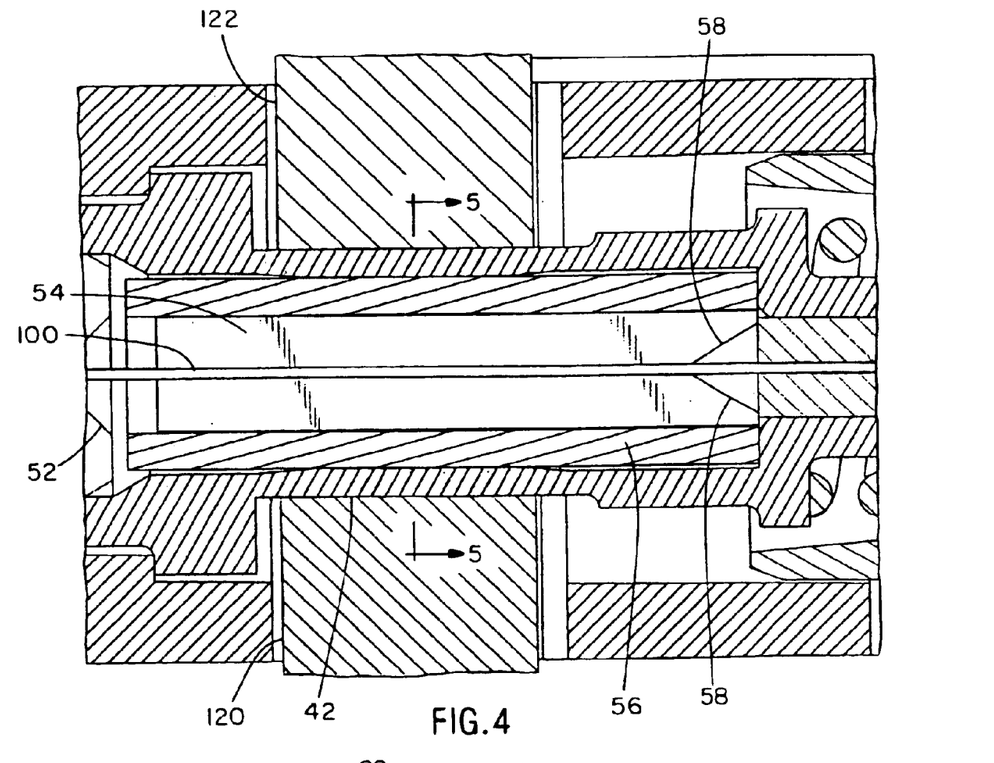
FIG. 4 shows a partial cross-sectional view of the connector of FIG. 1 in a crimping die after compression of the die.
Figure 5:
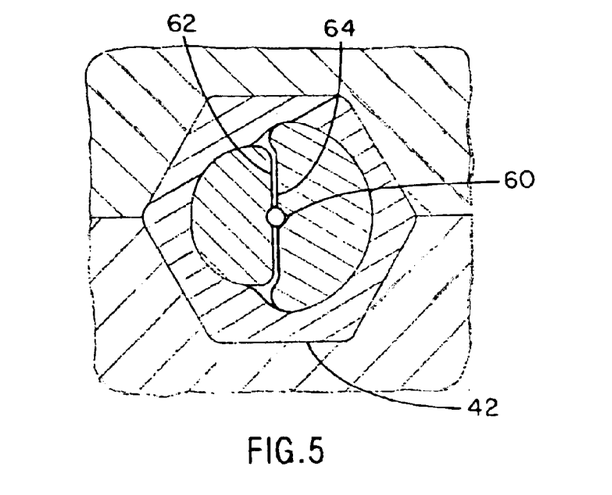
FIG. 5 shows a partial cross-sectional view of the connector of FIG. 1 in a crimping die after compression of the die, taken along the line 5—5 in FIG. 4 and looking in the direction of the arrows.

Once the field fiber 100 is fully inserted into the inner housing assembly 30 so that it comes flush with the stub fiber 110 within the ceramic ferrule 48, the crimping tool is then compressed more forcibly so that the preferably complementary upper glass fiber crimping die 122 of the tool compresses the glass fiber crimp section 42 of the backbone 36 about the top and bottom inserts, 54 and 56, respectively, carried therein (shown in FIGS. 3 and 4).

Figure 7:
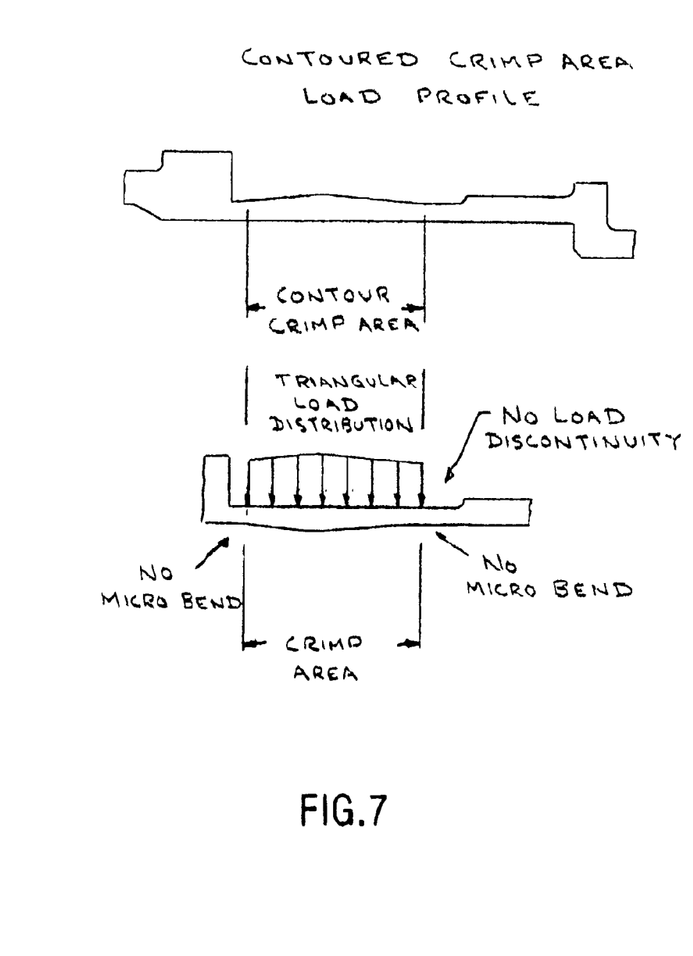
FIG. 7 shows a load distribution profile for a contoured crimp area in accordance with a preferred embodiment of the invention.

The contoured crimp section 42 is shaped so that when the crimping tool applies force to the crimp dies 120 and 122 and, thus, the crimp section 42, there is minimal compression force at the ends of the crimp section 42 and maximum compression force near the midpoint of the crimp section 42. The contoured crimp section 42 applies the load to the field fiber 100 through the top and bottom inserts 54 and 56, with a substantially triangular distribution profile, as shown in FIG. 7. This provides a smooth load transition between the crimped and uncrimped regions of the top and bottom inserts. Thus, a micro-bend is not created because the load distribution profile is tapered without any abrupt transitions.

Figure 8:
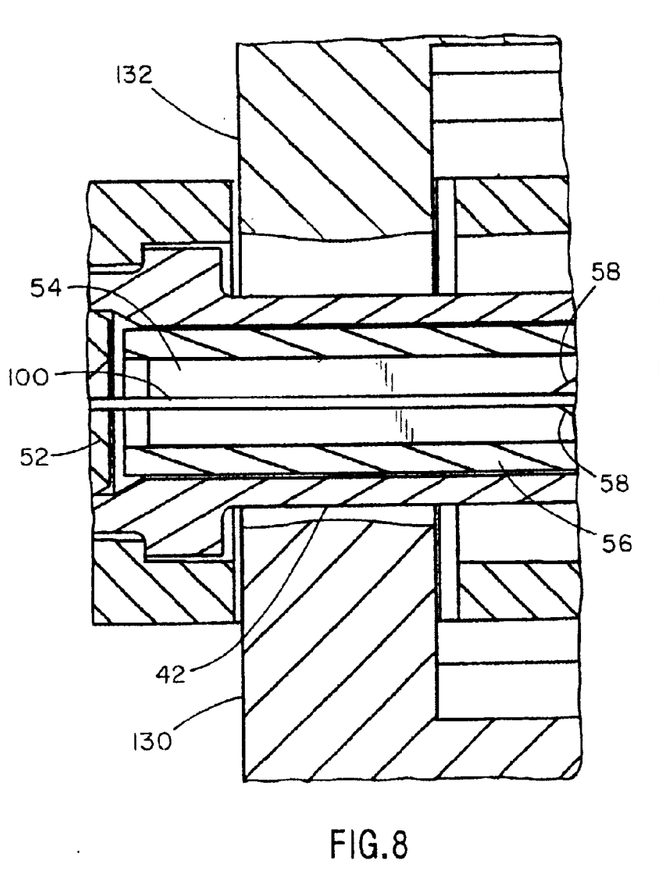
FIG. 8 shows a partial cross-sectional view of a connector in a contoured crimp die prior to compression of the die, in accordance with another embodiment of the invention.
Figure 9:
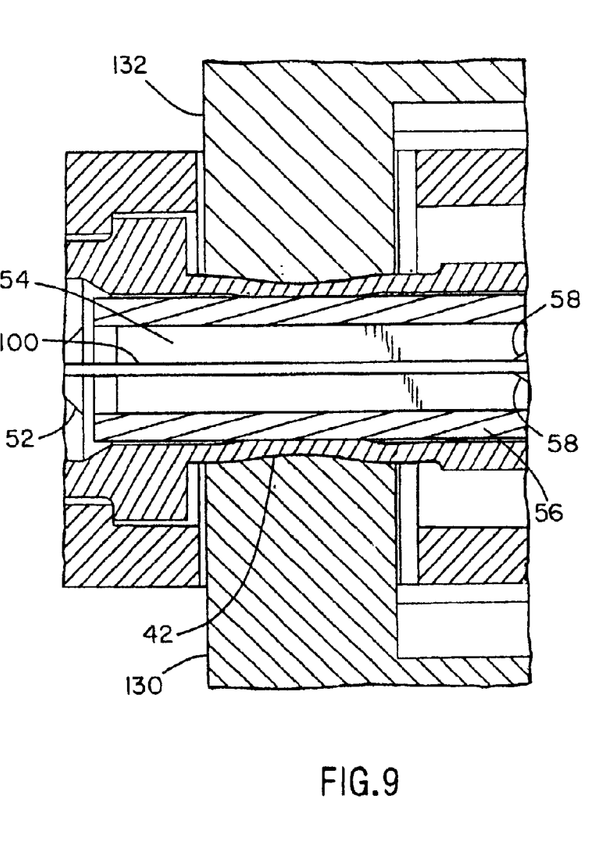
FIG. 9 shows a partial cross-sectional view of the connector of FIG. 8 in a contoured crimp die, after compression of the die.

In another preferred embodiment of the invention, and as can be seen in FIGS. 8 and 9, lower and upper crimp dies, 130 and 132, may have contoured surfaces, similar in shape to the contoured crimp section 42 disclosed in the embodiment shown in FIGS. 1–7. Contoured crimp dies 130 and 132 may be utilized with a straight profile crimp section to provide the substantially triangular load distribution profile shown in FIG. 7.

The disclosed invention provides an improved fiber optic connector. It should be noted that the above-described and illustrated embodiments and preferred embodiments of the invention are not an exhaustive listing of the forms such a connector in accordance with the invention might take; rather, they serve as exemplary and illustrative of embodiments of the invention as presently understood. By way of example, and without limitation, a non-SC-style fiber optic connector, such as an FJ or ST-style connector, is contemplated to be within the scope of the invention. Similarly, though the illustrated embodiment is directed toward a multimode cable connection, a single mode connection is also contemplated by the invention. Many other forms of the invention are believed to exist.

What is claimed is:

1. A fiber optic connector for terminating an optical fiber, the connector comprising:

a housing having opposed first and second ends, the housing receiving the optical fiber at the first end thereof;

an elongated member retainable in the housing, the elongated member including a crimpable portion, the crimpable portion being disposed within the housing, the crimpable portion having opposed first and second ends and a point between the first and second ends, the crimpable portion being tapered from the point toward one of the first and second ends;

a ferrule disposed within the elongated member; and at least one insert disposable within the crimpable portion of the elongated member.

2. The fiber optic connector of claim 1 wherein the crimpable portion is tapered from the point toward the first and second ends.

3. The fiber optic connector of claim 1 further includes two inserts disposable within the crimpable portion of the elongated member.

4. The fiber optic connector of claim 1 further includes a stub fiber disposed within an aperture in the ferrule.

5. The fiber optic connector of claim 4 wherein the optical fiber has a glass fiber core.

6. The fiber optic connector of claim 5 wherein the stub fiber contacts the glass fiber core in the at least one insert.

7. The fiber optic connector of claim 5 wherein the stub fiber contacts the glass fiber core in the ferrule.

8. A fiber optic connector for terminating an optical fiber, the connector comprising:
- a housing having opposed first and second ends, the housing receiving the optical fiber at the first end thereof;
- an elongated member retainable in the housing, the elongated member including a crimpable portion, the crimpable portion being disposed within the housing,
- the crimpable portion having opposed first and second ends and a point between the first and second ends, the crimpable portion being configured so that when a crimp die applies a force to the crimpable portion, the force is greater at the point than at the first and second ends; and
- at least one insert disposable within the crimpable portion of the elongated member.

9. The fiber optic connector of claim 8 further includes two inserts disposable within the crimpable portion of the elongated member.

10. The fiber optic connector of claim 8 further includes a ferrule disposed within the elongated member and a stub fiber disposed within an aperture in the ferrule.

11. The fiber optic connector of claim 10 wherein the optical fiber has a glass fiber core.

12. The fiber optic connector of claim 11 wherein the stub fiber contacts the glass fiber core in the at least one insert.

13. The fiber optic connector of claim 11 wherein the stub fiber contacts the glass fiber core in the ferrule.

14. A crimpable fiber optic connector for terminating on optical fiber, the connector being crimpable by a crimp tool having opposed crimp dies thereon, the connector comprising:
- a housing having opposed first and second ends, the housing receiving the optical fiber at the first end thereof;
- an elongated member retainable in the housing, the elongated member including a crimpable portion, the crimpable portion being disposed within the housing;
- a ferrule disposed within the elongated member; and
- at least one insert disposable within the crimpable portion of the elongated member,
- wherein at least one of the crimp dies having opposed first and second ends and a point between the first and second ends, the at least one crimp die being tapered from the point toward one of the first and second ends.

15. The crimpable fiber optic connector of claim 14 wherein each crimp die has opposed first and second ends and a point between the first and second ends, each crimp die is tapered from the point toward one of the first and second ends.

16. The fiber optic connector of claim 14 further includes two inserts disposable within the crimpable portion of the elongated member.

17. The fiber optic connector of claim 14 further includes a stub fiber disposed within an aperture in the ferrule.

18. The fiber optic connector of claim 17 wherein the optical fiber has a glass fiber core.

19. The fiber optic connector of claim 18 wherein the stub fiber contacts the glass fiber core in the at least one insert.

20. The fiber optic connector of claim 18 wherein the stub fiber contacts the glass fiber core in the ferrule.

21. A method for assembling a fiber optic connector, the method comprising the steps of:
- providing a housing having opposed first and second ends;
- providing an elongated member including a ferrule holding portion at one end thereof and a crimpable portion distinct from the ferrule holding portion, the crimpable portion having opposed first and second ends and a point between the first and second ends, the crimpable portion being tapered from the point toward one of the first and second ends;
- providing at least one insert;
- providing a ferrule having a front end and a rear end, the ferrule including an aperture extending from the front end to the rear end;
- providing a stub fiber having a width dimension sufficiently small to permit the stub fiber to be inserted into the ferrule aperture;
- inserting the stub fiber into the ferrule aperture;
- affixing the stub fiber within the ferrule aperture;
- inserting the at least one insert into the crimpable portion of the elongated member;
- inserting the ferrule at least partially into the ferrule holding portion of the elongated member;
- affixing the ferrule at least partially within the ferrule holding portion of the elongated member so as to retain the insert within the crimpable portion of the elongated member;
- crimping the crimpable portion of the elongated member;
- inserting the elongated member into the housing; and
- affixing the elongated member within the housing.

22. The method of claim 21 wherein the crimpable portion is tapered from the point toward the first and second ends.

23. A method for assembling a fiber optic connector, the method comprising the steps of:
- providing a housing having opposed first and second ends;
- providing an elongated member including a ferrule holding portion at one end thereof and a crimpable portion distinct from the ferrule holding portion, the crimpable portion having opposed first and second ends and a point between the first and second ends, the crimpable portion being tapered from the point toward one of the first and second ends;
- providing at least one insert;
- providing a ferrule having a front end and a rear end, the ferrule including an aperture extending from the front end to the rear end;
- providing a stub fiber having a width dimension sufficiently small to permit the stub fiber to be inserted into the ferrule aperture;
- inserting the stub fiber into the ferrule aperture;
- affixing the stub fiber within the ferrule aperture;
- inserting the at least one insert into the crimpable portion of the elongated member;
- inserting the ferrule at least partially into the ferrule holding portion of the elongated member;
- affixing the ferrule at least partially within the ferrule holding portion of the elongated member so as to retain the insert within the crimpable portion of the elongated member;
- crimping the crimpable portion of the elongated member while simultaneously crimping a buffer crimp portion;
- inserting the elongated member into the housing; and
- affixing the elongated member within the housing.

24. A method for terminating a multiple layered field optical fiber having a glass fiber core with an optical fiber connector including a housing having opposed first and second ends, an elongated member retainable in the housing and extending substantially from one of the opposed ends to the other of the opposed ends, the elongated member including a ferrule holding portion proximate the second end of the housing and a crimpable portion distinct from the ferrule holding portion, a ferrule disposable within the ferrule holding portion of the elongated member the ferrule including an aperture running therethrough, at least one insert disposed within the crimpable portion of the elongated member, and a stub fiber having opposing ends, the stub fiber being disposed within the aperture of the ferrule, the method comprising the steps of:

provoiding a crimp tool having opposed crimp dies thereon, wherein at least one of the crimp dies having opposed first and second ends and a point between the first and second ends, the at least one crimp die being tapered from the point toward one of the first and second ends;

stripping at least one layer from the field optical fiber to expose the glass fiber core;

placing the connector on at least one of the crimp dies of the crimp tool;

lightly closing the opposable crimp dies of the crimp cool over the connector to retain the connector on the crimp tool;

inserting the glass fiber core through the end of the elongated member closer to the first end of the housing, into the aperture of the ferrule and into contact with the stub fiber, and forcefully closing the opposable crimp dies of the crimp tool over the connector so as to crimp the crimpable portion of the elongated member and thereby retain the field fiber in contact with the stub fiber within the aperture of the ferrule.

25. The method of claim 24 wherein each of the crimp dies has opposed first and second ends and a point between the first and second ends, the crimp dies are tapered from the point toward one of the first and second ends.

26. A system for terminating an optical fiber, the system comprising:

a fiber optic connector having a housing with opposed first and second ends, the housing receiving the optical fiber at the first end thereof;

en elongated member retainable in the housing, the elongated member including a crimpable portion having first and second ends with a midpoint therebetween, the crimpable portion being disposed within the housing;

at least one insert disposable within the crimpable portion of the elongated member; and a crimp tool for compressing the crimpable portion of the fiber optic connector, the crimp tool having an upper crimp die and a lower crimp die, wherein the upper and lower crimp dies apply an axially perpendicular force to the crimpable portion thereby compressing the crimpable portion.

27. The system of claim 26 wherein the crimpable portion is contoured from the midpoint to the first and second ends.

28. The system of claim 26 wherein the crimp dies have opposed first and second ends and a point between the first and second ends, at least one of the crimp dies is contoured from the point toward one of the first and second ends.

29. The system of claim 26 wherein the force on the crimpable portion is greater near the midpoint of the crimpable portion than at the first and second ends of the crimpable portion.

* * * * *

UNITED STATES PATENT AND TRADEMARK OFFICE
CERTIFICATE OF CORRECTION

PATENT NO. : 6,722,790 B2  Page 1 of 1
DATED : April 20, 2004
INVENTOR(S) : Jack E. Caveney It is certified that error appears in the above-identified patent and that said Letters Patent is hereby corrected as shown below:

Column 5,
Line 31, "on" should read -- an --.

Column 7,
Line 24, "cool" should read -- tool --.

Column 8,
Line 12, "en" should read -- an --.

Signed and Sealed this

Thirty-first Day of May, 2005

JON W. DUDAS
*Director of the United States Patent and Trademark Office*